(12) United States Patent
Sharma (10) Patent No.: US 9,444,917 B2
(45) Date of Patent: Sep. 13, 2016

(54) DATA LINK LAYER PROTOCOL HAVING ADAPTIVE FRAMING

(71) Applicant: Google Inc., Mountain View, CA (US)

(72) Inventor: Vivek Sharma, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 108 days.

(21) Appl. No.: 14/272,051

(22) Filed: May 7, 2014

(65) Prior Publication Data

US 2014/0334501 A1 Nov. 13, 2014

Related U.S. Application Data

(60) Provisional application No. 61/820,547, filed on May 7, 2013.

(51) Int. Cl.
*H04L 29/08* (2006.01)

(52) U.S. Cl.
CPC .................. *H04L 69/324* (2013.01)

(58) Field of Classification Search
CPC ... H04L 61/10; H04L 1/1838; H04L 1/0001; H04L 1/0007; H04L 1/20; H04L 1/08; H04L 1/0009
See application file for complete search history.

(56) References Cited

U.S. PATENT DOCUMENTS

| | | | |
|---|---|---|---|
| 5,461,618 A | 10/1995 | Chen et al. | |
| 2004/0240451 A1* | 12/2004 | Lee | H04L 12/2803 370/395.5 |
| 2006/0023713 A1* | 2/2006 | Choi | H04L 1/1838 370/389 |
| 2007/0005808 A1* | 1/2007 | Day | H04L 41/145 709/248 |

OTHER PUBLICATIONS

Ziermann, et al., "CAN+: A new backward-compatible Controller Area Network (CAN) protocol with up to 16x higher data rates," Jurgen Teich, Apr. 2009, 6 pp.
"Serial Line Internet Protocol," Wikipedia, retrieved on May 6, 2014 from http://en.wikipedia.org/wiki/Serial_Line_Internet_Protocol, 2 pp.
Romkey, et al., "A Nonstandard for Transmission of IP Datagrams Over Serial Lines: SLIP," Network Working Group, Jun. 1988, 6 pp.
"Working Paper of Enhancements to HDLC," ISO/IECJTC 1/SC 6, Telecommunications and information Exchange Between Systems, Aug. 17, 1996, 9 pp.

* cited by examiner

*Primary Examiner* — Anez Ebrahim
(74) *Attorney, Agent, or Firm* — Shumaker & Sieffert, P.A.

(57) ABSTRACT

Example techniques of the present disclosure provide a first computing device comprising one or more processors and at least one module operable by the one or more processors to output, to a second computing device, a first set of HDLC protocol data units in accordance with a first format in which each of the first set of HDLC protocol data units includes a start-of-frame indicator, a length indicator, a data portion, and an end-of-frame indicator. The module may be further operable by the one or more processors to determine an inability of the second computing device to process at least one of the first set of HDLC protocol data units and output a second set of HDLC protocol data units in accordance with a second format in which each of the second set includes the data portion, a checksum portion, and the end-of-frame indicator and excludes the length indicator.

17 Claims, 4 Drawing Sheets

DATA LINK LAYER PROTOCOL HAVING ADAPTIVE FRAMING

This application claims the benefit of U.S. Provisional Application No. 61/820,547, filed May 7, 2013, the entire content of which is incorporated by reference herein.

BACKGROUND

Some computing devices (e.g., mobile phones, laptop computers, desktop computers, servers, or other such devices) may be configured to transmit and receive data to other computing devices. Applications and modules of a computing device may transmit and receive data via one or more wired or wireless connections using a variety of protocols and transmission methods. For instance, a computing device may be connected to another computing device via a network connection, and an application executing on one computing device may use the network connection to send and receive data to an application of the other computing device. In some cases, the connection may be a wired connection, such as a universal serial bus (USB) cable.

When transmitting data, an operating system or other component of a computing device typically encodes the data in accordance with one or more protocols. The computing device may, for example, divide the data to be transmitted into chunks, often referred to as protocol data units (e.g., frames or packets). A protocol data unit, for various protocols, may include a part of the data that is to be transmitted (e.g., payload data) and a portion that is used to ensure the transmitted data is correctly received by the receiving computing device (e.g., a checksum). The checksum may, for instance, be a value calculated based on the payload data. In this way, the computing devices may maintain integrity of data during transmission and receipt. One example protocol is the high-level data link control (HDLC) protocol that provides transport layer framing for data payloads. HDLC provides byte-by-byte cyclical-redundancy-check (CRC) computation within each frame, thereby providing a degree of error checking.

SUMMARY

In one example a method includes outputting, by a first device and to a second device, a first set of high-level data link control (HDLC) protocol data units in accordance with a first format in which each of the first set of HDLC protocol data units includes a start-of-frame indicator, a length indicator, a data portion, and an end-of-frame indicator. The method may further include determining, by the first device, an inability of the second device to process at least one of the first set of HDLC protocol data units, and outputting, by the first device and in response to the determining, a second set of HDLC protocol data units in accordance with a second format in which each of the second set of HDLC protocol data units includes the data portion, a checksum portion, and the end-of-frame indicator and excludes the length indicator.

In another example, a computer-readable storage medium is encoded with instructions that, when executed, cause one or more processors of a first computing device to output, to a second computing device, a first set of high-level data link control (HDLC) protocol data units in accordance with a first format in which each of the first set of HDLC protocol data units includes a start-of-frame indicator, a length indicator, a data portion, and an end-of-frame indicator. The computer-readable medium may be further encoded with instructions that, when executed, cause the one or more processors of the first computing device to determine an inability of the second computing device to process at least one of the first set of HDLC protocol data units, and output, in response to the determining, a second set of HDLC protocol data units in accordance with a second format in which each of the second set of HDLC protocol data units includes the data portion, a checksum portion, and the end-of-frame indicator and excludes the length indicator.

In another example, a first computing device comprises one or more processors and at least one module operable by the one or more processors to output, to a second computing device, a first set of high-level data link control (HDLC) protocol data units in accordance with a first format in which each of the first set of HDLC protocol data units includes a start-of-frame indicator, a length indicator, a data portion, and an end-of-frame indicator. The at least one module may be further operable by the one or more processors to determine an inability of the second computing device to process at least one of the first set of HDLC protocol data units and output, in response to the determining, a second set of HDLC protocol data units in accordance with a second format in which each of the second set of HDLC protocol data units includes the data portion, a checksum portion, and the end-of-frame indicator and excludes the length indicator.

The details of one or more examples are set forth in the accompanying drawings and the description below. Other features, objects, and advantages will be apparent from the description and drawings, and from the claims.

DETAILED DESCRIPTION

Techniques of the present disclosure are directed to a data-link layer transmission protocol having adaptive framing. The data-link layer transmission protocol may, for example, adaptively include or exclude error detection information based on a reliability assessment of an underlying physical (wired or wireless) transport layer or upon determining that a receiving device does not support a modified frame format. Example data-link layer transmission protocols include, for example, the High-Level Data Link Control (HDLC) protocol, Frame Relay, Asynchronous Transfer Mode (ATM) and the Ethernet protocol.

As one example implementation, the techniques may enable a computing device to adaptively transmit and receive variable formats for High-Level Data Link Control (HDLC) frames and other protocol data units by providing an encoder and decoder capable of encoding and decoding two or more formats for the protocol data unit. Moreover, the encoder and/or decoder of the computing device may adaptively switch between the use of the HDLC frames having different formats based on a reliability assessment of an underlying transport layer.

In general, a computing device, such as a smartphone, a desktop computer, a server system, or other computing device may communicate using a number of data transmission protocols (e.g., HDLC, Internet Protocol, and the like) to output data across one or more networks. For some data transmission protocols, the data may be split into a number of chunks, each chunk "framed" or "packetized" as payload data, in order to adhere to a protocol data unit format for the protocol. For instance, HDLC may portion the data in to frames that are provided to a lower network level (e.g., to later be transmitted via the physical layer). Various protocols may employ error checking methods to ensure the payload data received by a second computing device is the same as the payload data transmitted by the first device.

However, formatting the data and generating frames or packets may consume a large amount of computing resources, such as when error checking methods for a protocol include calculating a byte-by-byte cyclic redundancy check (CRC) for the payload data. This byte-by-byte calculation may be especially expensive for processors employing a reduced instruction set computing (RISC) model, such as low-end ARM-based processors. Additionally, such error checking methods may be redundant and/or unneeded, such as when multiple protocols (e.g., at different layers of the network) each employ error checking methods for the same data and/or when the lower layers of a network are sufficiently reliable. In one example, HDLC encoding is used for framing data payloads over physical transport layers. Framing can use a large amount of CPU processing power if the framing does a byte-by-byte CRC calculation for the data payload. This byte-by-byte framing may be expensive in low-end, ARM based processors as multiple instructions are often required to fetch a 32-bit value from memory, convert it to an 8-bit value, and perform a subsequent CRC calculation.

In one aspect of the present disclosure, a first computing device may output a first set of high-level data link control (HDLC) protocol data units to a second computing device. The first set of HDLC protocol data units may be output in accordance with a first format in which each of the first set of HDLC protocol data units includes a start-of-frame indicator, a length indicator, a data portion, and an end-of-frame indicator. That is, the first format may not include a checksum, cyclic redundancy check (CRC), or other error checking information. At some point, the first computing device may determine an inability of the computing device to receive and process at least one of the first set of protocol data units, thereby providing an indication that the underlying transport medium may be currently unreliable. For instance, the first computing device may receive one or more indications from the second computing device that the second computing device failed to receive or process a number of the first set of protocol data units. In response to determining that the second computing device is unable to process the first set of protocol data units, the first computing device may adaptively switch operation to forming and outputting a second set of HDLC protocol data units in accordance with a second format. The adaptive encoder of the first computing device may, for example, format the second set of HDLC protocol data units to include a data portion, a checksum portion, and the end-of-frame indicator and excludes the length indicator.

When the underlying transport layer is reliable, or the transport layer provides its own CRC check (e.g., such as with a USB interface), the calculation of a CRC in the data link layer framing process may be redundant and may use up computing resources. That is, when the underlying transport layer and/or physical layer is reliable, the CRC calculation of the HDLC framing can be avoided and the entire payload can be copied as is, possibly using more efficient instructions by the encoder. In one example, the existing format of an HDLC frame may be modified to add a 2-byte "length" field that indicates the length (e.g., in bytes) of the payload. Once this 2-byte field is read by a receiving device, the receiving device can then read the required number of bytes and then expect an end-of-frame marker. By specifying the length of the payload, the framing and un-framing of the HDLC protocol may not require any CRC calculation or check. In some examples, the transport layers below may handle error checking methods. In the event of the length field being corrupted or the payload not being the correct size, the receiving device may track to the next start-of-frame marker and attempt to read the next frame, until the receiving device is back in sync. This error-recovery may be very detailed. However, it is expected to be a rare event. If the receiving device is not able to get back in sync, this faster encoding may be disabled, such as via an application layer setting.

The modification to HDLC as disclosed herein may not need an alternative to the CRC computation, but rather adaptively determines when the calculation and CRC information can be omitted from the PDUs communicated from the encoder and decoder. This modified HDLC framing format may result in significantly lower processor usage, both on the producer and the consumer side. The modified HDLC format may be extremely efficient for certain processors, such as ARM based processors, and may be fully compatible in run-time with the conventional HDLC protocol. Estimated savings is of the order of 50% when compared with the un-altered HDLC framing format.

HDLC framing may be done in software or by using hardware blocks which perform dedicated HDLC encoding. These hardware blocks may be faster than software, but the techniques of the present disclosure are not intended to compete in performance with such hardware blocks. However, such hardware blocks are often already in use by another interface. So a second and potentially third interface often have to rely on software to perform the framing and un-framing. In such situations, the modified HDLC framing format can provide significantly better processor utilization. Additionally, while other protocols, such as Transmission Control Protocol (TCP) and Internet Protocol (IP) data units may be used to transmit data, the overhead in encoding and decoding such protocol data units may be more expensive than the techniques described herein.

Techniques of the present disclosure may enable faster and more efficient transmission of data by enabling a computing device to encode and/or decode data using a modified format for protocol data units in addition to a conventional format. For instance, techniques of the present disclosure may provide an efficient HDLC-like framing format that works efficiently for ARM processors or other processors. When errors in the underlying network or physical interface used for the communication are low, or when payload data undergoes other error checking procedures by the underlying physical interface, the computing device may adaptively elect to transmit protocol data units in a format that does not include CRC information, thereby avoiding a CRC calculation by both the encoder and the decoder. That is, the modified format may remove the redundant CRC calculation, such as when a transport layer (e.g., USB interface) already provides a separate CRC calculation. If errors are detected by the computing device (e.g., when the receiving computing device is unable to process the protocol data units), the computing device may revert to transmitting protocol data units using the conventional format. In other words, the modified and conventional formats may co-exist in real time and computing devices may maintain backwards compatibility. A receiving computing device may be able to process protocol data units of both formats in the same stream. Additionally, a transmitting computing device may be able to output both formats in the same stream, allowing for run-time enabling or disabling of the modified format based on underlying network conditions. By providing a fast encoding format for use when error rates in the underlying layers are low, the techniques of the present disclosure may shift the focus of the processor from constant work in the common case to reduced work in the common case and only more work in the error case.

Figure 1:
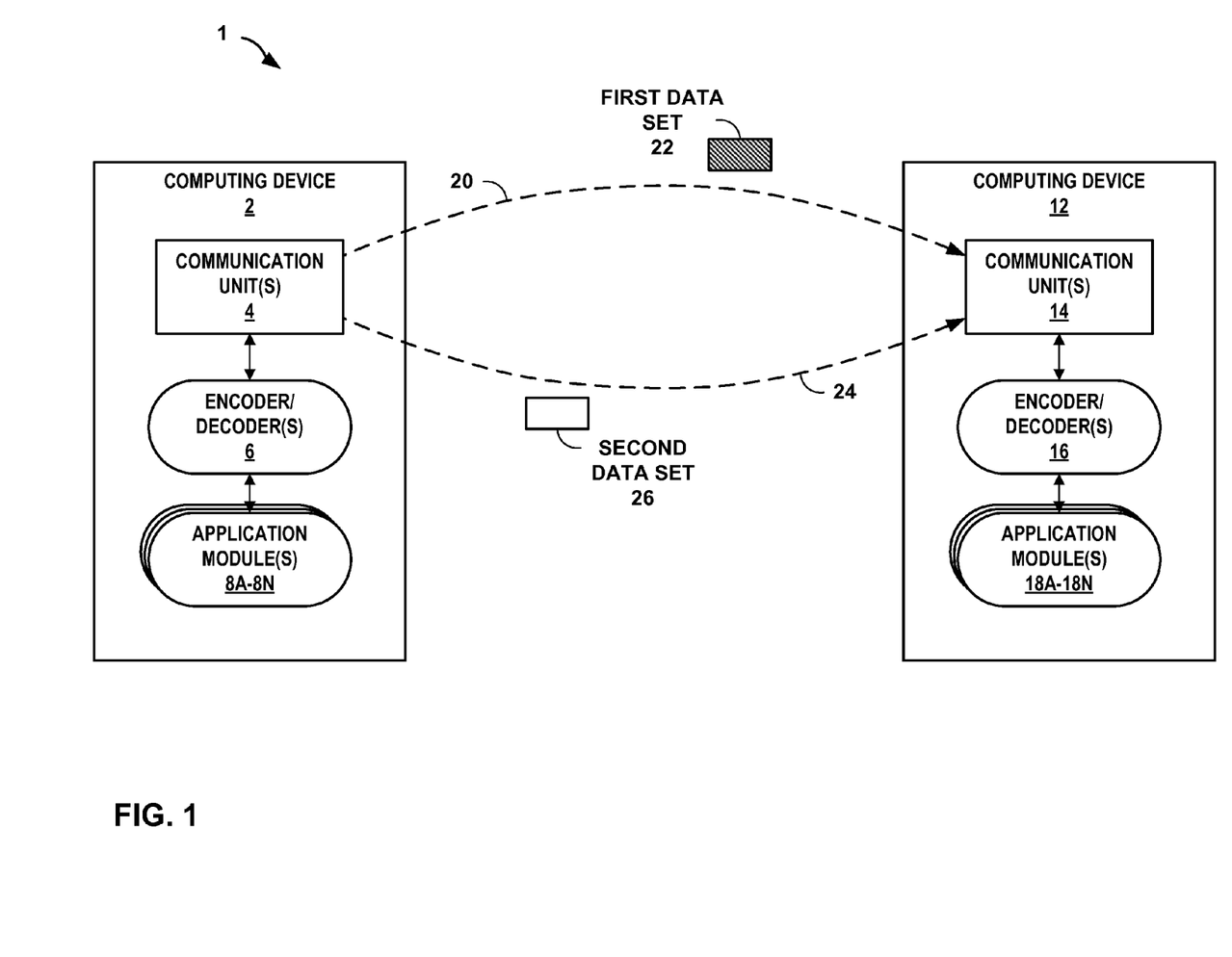
FIG. 1 is a block diagram illustrating an example system for providing adaptive framing of protocol data units of a data link layer protocol, in accordance with one or more aspects of the present disclosure.

FIG. 1 is a block diagram illustrating an example system 1 for providing adaptive framing of protocol data units of a data link layer protocol, in accordance with one or more aspects of the present disclosure. In the example of FIG. 1, system 1 includes computing devices 2 and 12. Computing devices 2 and 12, in some examples, include or are part of a portable computing device (e.g., mobile phone, netbook, laptop, or tablet device), a desktop computer, a server computer or server system, or other device capable of communicating data. In the example of FIG. 1, computing devices 2 and 12 may include respective communication units 4 and 14, respective encoder/decoders 6 and 16, and respective application modules 8A-8N (collectively "application modules 8") and application modules 18A-18N (collectively "application modules 18").

Application modules 8 may represent one or more applications executed by computing device 2, such as an operating system, an email application, an audio library management application, or other application. In some examples, one or more of application modules 8 may attempt to communicate with computing device 12. Consequently, encoder/decoders 6 may receive data from application modules 8 to be transmitted to computing device 12. Encoder/decoders 6 may prepare the received data for transmission by encoding the data received from application modules 8 in accordance with one or more protocols. The protocol or protocols used by encoder/decoders 6 may depend at least in part on which of communication units 4 is used to transmit the data. Encoder/decoders 6 may, in some examples, encode the data into protocol data units using a data link layer protocol, such as HDLC. In some examples, only a single protocol may be used to encode the data. In other examples, other or more protocols may be used. In the example of FIG. 1, encoder/decoders 6 may copy and encode the data received from application modules 8 into HDLC frames and send the frames to communication units 4 to be encoded into USB packets for transmission via a USB connection. That is, encoder/decoders 6 may maintain the data received from application modules 8 while also encoding the data.

In formatting the data for USB packets, communication units 4 may calculate a CRC value for the payload data. That is, communication units 4 may perform a series of operations on the payload data of each USB packet to determine a CRC value, and include the CRC value in the respective packet. By including the CRC value, a receiving communication unit may be able to determine whether the payload data includes an error or is otherwise corrupted. The later encoded USB packets include a way for a receiving computing device to check for errors, and thus, in some examples, it may be unnecessary and/or inefficient for the HDLC frames to also include a CRC or other checksum, generated using techniques that may be computationally expensive. In other examples, generating a CRC for each HDLC frame may be unnecessary if the underlying layer or layers are reliable. That is, when underlying transports are reliable, the CRC calculation can be avoided and the payload data can be copied as is, using more efficient instructions.

In any case, encoder/decoders 6 may encode the data received from application modules 8 using a modified framing format for HDLC frames. In some examples, the HDLC protocol data unit can be modified to add a starting marker, followed by a 2-byte field to indicate length. The length field indicates the number of bytes of the payload. After the payload is sent, HDLC is then required to send an end-of-frame marker. By specifying the length of the payload, the encoding and decoding procedures for the modified format may not require any CRC calculation or check. Instead, other layer protocols (e.g., USB) do perform error checking and prevention. In the event of the length field being garbled or the payload not being the size of the length field, the receiving computing device may discard the present frame, proceed to the next frame, and attempt to process the next frame. While an out-of-sync event may be rare, various methods of error recovery can be used to deal with such out-of-sync issues. An example of a modified HDLC framing format is further described with respect to FIG. 3 below.

After encoding data received from application modules 8 in accordance with the modified HDLC framing format, encoder/decoders 6 may, in the example of FIG. 1, provide the encoded frames to one or more of communication units 4, such as communication units associated with a physical communication interface (e.g., USB). Hardware and/or software or firmware of communication units 4 may further process the HDLC frames for transmission, such as over a physical interface (e.g., a USB interface) to computing device 12.

In one example, responsive to receiving the HDLC frames from encoder/decoders 6, communication units 4 may output transmission 20, including first data set 22. In some examples, transmission 20 may travel through one or more wireless or wired networks, such as one or more packet based networks. In other examples, transmission 20 may travel through a single connection, such as a network cable, USB cable, or other serial or parallel link. In the example of FIG. 1, computing device 2 may be connected to computing device 12 via a USB cable and transmission 20 may be a series of data transmissions. First set of data 22 may be a set of protocol data units encoded at least in accordance with the modified HDLC framing format. In various examples, first data set 22 may also be encoded with one or more other formats.

Communication units 14 of computing device 12 may receive the set of protocol data units included in first data set 22. In some examples, communications units 14 may include functionality similar to or the same as communications units 4. In other examples, communications units 14 may perform more or fewer functions. Upon receiving packets in first data set 22, communications units 14 processes the inbound data (e.g., including extracting HDLC frames from the USB communication format and performing any CRC processing that may be incorporated within the USB interface as part of the physical layer communication) and make the data available to encoder/decoders 16 for further processing.

In turn, data link layer encoder/decoders 16 may receive and decode the resultant modified HDLC frames. In some examples, encoder/decoders 16 may be enabled to decode data in the modified HDLC framing format. For instance, conventional HDLC frames use a binary value representing 0x7E as a frame delimiter. This frame delimiter may not be expected to be present in an HDLC framed payload. The presence of the frame delimiter 0x7E as the first byte in the payload may indicate to a receiving device that a payload of the new format is being received. This may allow for protocol data units to be sent in a conventional format as well as in a new format, both in the same byte stream. That is, techniques of the present disclosure may deploy the modified format on devices where one or more processors employ different formatting, such as a mobile device having an application processor using the modified format and a modem processor using the conventional format.

In other examples, such as when computing device 12 is a legacy device, or a device not enabled to handle modified HDLC framing, encoder/decoders 16 may attempt to decode and process the modified HDLC frames as if they were HDLC frames of a conventional format, or may immediately return an error to computing device 2 upon failing to recognize the formatting of the frame. In some examples, computing device 12 may be able to handle the modified packets, but may get "out of sync," when, for instance, the length field is corrupted. In the event of a receiving device getting out of sync, it needs to fetch the next start of frame marker and length field. If the reader is not able to get back in sync, an application layer setting can disable the use of the faster, modified encoding. To correct the error, encoder/decoders 16 may, in some examples, wait for the next starting marker and length field. If encoder/decoders 16 are unable to achieve re-synchronization, computing device 12 may send an indication of the out-of-sync error to computing device 2. In the example of FIG. 1, encoder/decoder 16 may be unable to process the modified HDLC frames. Responsive to determining that encoder/decoders 16 cannot process the data, encoder/decoders 16 may discard the received information (e.g., first data set 22).

In some examples, encoder/decoders 16 may generate one or more indications of the failure, and send the indications to communication units 14. Communication units 14 may send the received indication or indications of failure, and send the indication or indications to communication units 4. Communications units 4 may receive the one or more indications, and provide the indication or indications to encoder/decoders 6. In some examples, encoder/decoders 16 may count the number of protocol data units that it could not process, and cause communication units 14 to send a control message to computing device 2 in order to disable use of the modified formatting. Disabling the modified formatting may be useful, for instance, if the modified formatting is deployed over error prone physical interfaces.

Encoder/decoders 6 (or other components of computing device 2) may determine an inability, of computing device 12, to process at least some of the data protocol units included in first data set 22. In some examples, encoder/decoders 6 may determine the inability based at least in part upon one or more received indications. In other examples, encoders/decoders 6 may determine the inability based on other criteria, such as a lack of a response from computing device 12 (e.g., the expiration of a timeout period). In some examples, application modules 8 may determine whether or not to use the modified format for a protocol data unit, or the conventional format. That is, if one of application modules 8 determines that it is unable to send or receive data, the application module may instruct encoder/decoders 6 to encode HDLC frames using the conventional format.

In any case, responsive to determining an inability of computing device 12 to process at least some of the data protocol units included in first data set 22, encoder/decoders 6 may use the maintained data previously received from application modules 8 to re-encode the data using one or more different framing formats. That is, for instance, encoder/decoders 8 may encode the data previously received from application modules 8 using the conventional format for the protocol data units. In some examples, the change in format may be based on the indication or indications received. For instance, the indication sent by computing device 12 may indicate successful processing of the USB packets, but a failure to decode the modified HDLC frames. In other examples, the change in format may be based on the specific modification used. That is, if only one modified protocol data unit format was used previously, encoder/decoders 6 may use the unmodified format of the protocol data unit. In the example of FIG. 1, encoder/decoders 6 may encode the data using the conventional HDLC framing format. In accordance with techniques of the present disclosure, encoder/decoders 6 may then send the encoded data to communication units 4 for further encoding and/or transmission.

Communication units 4 may output transmission 24, including second data set 26. In the example of FIG. 1, second data set 26 may include HDLC protocol data units formatted in accordance with a second format (e.g., within the payload data of the USB packets). That is, the HDLC protocol data units of second data set 26 may be formatted using the conventional HDLC frame format, whereas the HDLC protocol data units of first data set 22 may be formatted using the modified HDLC frame format. In accordance with the conventional HDLC frame format, each of the second set of HDLC protocol data units may include a data portion (e.g., the payload data), a checksum portion (e.g., the CRC), and the end-of-frame indicator. The conventional HDLC frame format may exclude the length indicator included in the modified HDLC frame format. Communications units 14 may receive second data set 26 and provide the HDLC frames of second data set 26 to encoder/decoders 16.

Communication units 14 may decode and process the USB packets, and encoder/decoders 16 may subsequently decode and process the HDLC frames. In the process of decoding and processing the USB packets and HDLC frames, both communication units 14 and encoder/decoders 16 may calculate a CRC. The data included in the data payload of the HDLC frames may be combined, and provided by encoder/decoders 16 to one or more application modules 18, or other components of computing device 12.

The alternative framing format described herein may be extremely efficient for RISC processors, ARM-based processors, or other processors. In some examples, techniques of the present disclosure can be performed by components other than those described. For instance, while described in the context of encoder/decoders 6 and 16 performing encoding and decoding functions, application modules 8 and 18 may perform the same or similar functions in other examples. The components and devices described herein may, in some examples, be defined as different components or combined into fewer components for performing techniques of the present disclosure.

Techniques of the present disclosure may enable a computing device to encode data for transmission more efficiently by using modified protocol data unit formatting, while still maintaining seamless backward compatibility with conventional protocol data unit formatting. Such functionality may be deployed incrementally (e.g., to some components of computing devices 2 and 12 while not to others), allowing for a smooth transition for capable devices. Additionally, by determining an inability of a receiving computing device to process the modified format and resending information using the conventional format, techniques of the present disclosure may include the ability to enable and disable the new protocol in runtime based on underlying physical layer conditions and/or error rates.

Figure 2:
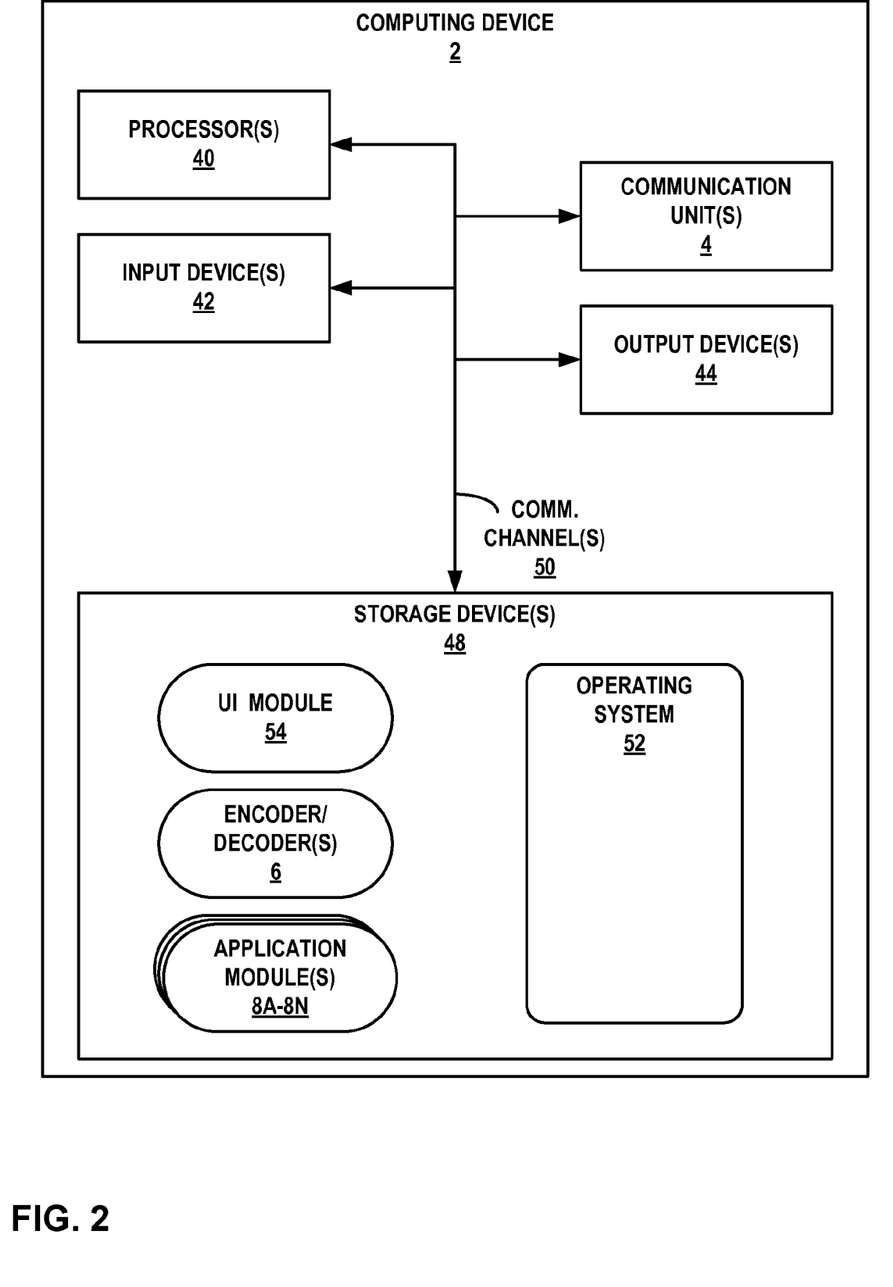
FIG. 2 is a block diagram illustrating further details of one example of a computing device for providing adaptive framing of protocol data units of a data link layer protocol, in accordance with one or more aspects of the present disclosure.

FIG. 2 is a block diagram illustrating further details of one example of computing device 2 for providing adaptive framing of protocol data units of a data link layer protocol, in accordance with one or more aspects of the present disclosure. FIG. 2 illustrates only one particular example of computing device 2, and many other examples of computing device 2 may be used in other instances. Moreover, the example of computing device 2 may similarly represent an example of computing device 12 of FIG. 1

As shown in the specific example of FIG. 2, computing device 2 includes one or more processors 40, one or more input devices 42, one or more communication units 4, one or more output devices 44, and one or more storage devices 48. Computing device 2, in the specific example of FIG. 2, further includes operating system 52, UI module 54, encoder/decoders 6, and application modules 8. Each of components 4, 40, 42, 44, and 48 may be interconnected (physically, communicatively, and/or operatively) for intercomponent communications. As one example in FIG. 2, components 4, 40, 42, 44, and 48 may be coupled by one or more communication channels 50. In some examples, communication channels 50 may include a system bus, network connection, interprocess communication data structure, or any other channel for communicating data. Modules 54, and 12 as well as operating system 52, and encoder/decoders 6 may also communicate information with one another as well as with other components in computing device 2.

Processors 40, in one example, are configured to implement functionality and/or process instructions for execution within computing device 2. For example, processors 40 may be capable of processing instructions stored in storage device 48. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry. In some examples, one or more of processors 40 may implement specific functionality, while others of processors 40 may implement other functionality. For instance, one of processors 40 may be designated a "modem" or "communications" processor, and may process instructions for communicating data via one or more of communications units 4. Other of processors 40 may be designated as "application" processors, operable to process instructions for execution of one or more of application modules 8. In other examples, processors 40 may be operable to perform multiple or various functions.

One or more storage devices 48 may be configured to store information within computing device 2 during operation. Storage device 48, in some examples, is described as a computer-readable storage medium. In some examples, storage device 48 is a temporary memory, meaning that a primary purpose of storage device 48 is not long-term storage. Storage device 48, in some examples, is described as a volatile memory, meaning that storage device 48 does not maintain stored contents when the computer is turned off. Examples of volatile memories include random access memories (RAM), dynamic random access memories (DRAM), static random access memories (SRAM), and other forms of volatile memories known in the art. In some examples, storage device 48 is used to store program instructions for execution by processors 40. Storage device 48, in one example, is used by software or applications running on computing device 2 (e.g., modules 54 or 12, or encoder/decoders 6) to temporarily store information during program execution.

Storage devices 48, in some examples, also include one or more computer-readable storage media. Storage devices 48 may be configured to store larger amounts of information than volatile memory. Storage devices 48 may further be configured for long-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable memories (EEPROM).

In some examples, computing device 2 includes one or more communications units 4. Computing device 2 may utilize communication units 4 to communicate with computing devices (e.g., computing device 12), or with other external devices, via one or more connections or networks. That is, communications units 4 may be used to transmit and/or receive data, such as over the physical layer. Connections may, in some examples, include wired connections, such as a network cable or a USB cable, as well as wireless or other connection between two or more devices. Networks may represent a collection of connections for communicating among two or more devices. Examples of a network may include a wired or wireless network, such as the Internet. Communication units 4 may include a network interface card, such as an Ethernet card, an optical transceiver, a radio frequency transceiver, a USB port for connecting to a universal serial bus, or any other type of device that can send and receive information. Other examples of communication units 4 may include Bluetooth, 3G and WiFi radio components.

Computing device 2, in one example, also includes one or more input devices 42. Input devices 42, in some examples, are configured to receive input from a user through tactile, audio, or video feedback. Examples of input devices 42 include a presence-sensitive display, a presence-sensitive or touch-sensitive input device, a mouse, a keyboard, a voice responsive system, video camera, microphone or any other type of device for detecting a command from a user. In some examples, a presence-sensitive display includes a touch-sensitive screen.

One or more output devices 44 may also be included in computing device 2. Output devices 44, in some examples, are configured to provide output to a user using tactile, audio, or video stimuli. Output devices 44, in one example, include a presence-sensitive display, a sound card, a video graphics adapter card, or any other type of device for converting a signal into an appropriate form understandable to humans or machines. Additional examples of output devices 44 include a speaker, a cathode ray tube (CRT) monitor, a liquid crystal display (LCD), or any other type of device that can generate intelligible output to a user.

Computing device 2 may include operating system 52. Operating system 52, in some examples, controls the operation of components of computing device 2. For example, operating system 52, in one example, facilitates the communication of encoder/decoders 6, modules 8, and 54 with processors 40, communication units 4, storage device 48, input devices 42, and output devices 44. Encoder/decoders 6 as well as modules 8 and 54 may each include program instructions and/or data that are executable by computing device 2. As one example, encoder/decoders 6 may include instructions that cause computing device 2 to perform one or more of the operations and actions described in the present disclosure.

In some examples, computing device 2 may include UI module 54. UI module 54 may be software, firmware, hardware, or some combination thereof operable to receive indications of input from one or more of input devices 42 and provide the input to one or more other components of computing device 2 (e.g., application modules 8 or operating system 52). For instance, a keyboard (e.g., one of input devices 42) may provide an indication of text input to UI module 54. UI module 54 may consequently provide data for the text input to one of application modules 8 (e.g., a chat application). UI module 54 may also be operable to receive indications from one or more other components of computing device 2 and send data to one or more of output devices 44. That is, UI module 54 may be operable to communicate with input devices 42 and output devices 44.

Computing device 2, in the example of FIG. 2, may include one or more encoder/decoders 6. Encoder/decoders 6 may be modules implemented as hardware, software, firmware, or any combination thereof. That is, while shown as software or firmware stored within storage devices 48, encoders/decoders 6 may, in other examples, be physical components of computing device 2. Computing device 2 may utilize encoder/decoders 6 to encode data in accordance with one or more data transmission protocols (e.g., data link layer protocols) for transmission via communication units 4. Examples of data transmission protocols include Hypertext Transfer Protocol (HTTP), User Datagram Protocol (UDP), Internet Protocol (IP), HDLC, or any other protocol. In some examples, computing device 2 may include more than one of encoder/decoders 6 and data to be transmitted may be encoded in accordance with more than one protocol. For instance, computing device 2 may encode data to be transmitted using a first of encoder/decoders 6 in accordance with IP, and subsequently using a second of encoder/decoders 6 to encode the resulting data in accordance with the HDLC protocol. Encoder/decoders 6 may send encoded data to communication units 4 for processing and/or transmission.

In accordance with techniques of the present disclosure, application modules 8, operating system 52, or other components of computing device 2 may send data to encoder/decoders 6 to be output via communication units 4. In some examples, data sent by application modules 8 may be in response to receiving input (e.g., from a user) via one or more of input devices 42. For instance, input devices 42 may receive input (e.g., a key press, a mouse selection, a tap gesture) and send an indication of the input to UI module 54. UI module 54 may provide the input to one or more of application modules 8. In other examples, data sent by application modules 8 or operating system 52 may be automatically generated. For instance, a debug interface of operating system 52 may generate debug log files to be sent to an external device via USB. The debug interface may share hardware of computing device 2 (e.g., encoder/decoders 6) for framing and un-framing, and consequently the debug interface may consume processing resources that could be used by other components. Techniques of the present disclosure may be applied by any component of a computing device (e.g., a mobile phone) seeking to transfer data from the computing device to a second computing device (e.g., a desktop computer). A modified HDLC protocol data unit may provide significant advantage when encoding data for transmission from a device having a low-end or mobile processor.

In any case, encoder/decoders 6 may receive the data to be transmitted, and encode the data for transmission. In some examples, encoder/decoders 6 may encode the data based on an indication received with the data, such as from one of application modules 8 or operating system 52. In other examples, encoder/decoders 6 may determine the encoding. In the example of FIG. 2, computing device 2 may encode the data in accordance with the HDLC protocol at the data link layer, and subsequently encode the data in accordance with the USB protocol at the physical layer, for transmission via a USB interface. In accordance with one or more techniques of the present disclosure, encoder/decoders 6 may encode the data to be transmitted using a modified framing format for the HDLC protocol. That is, because the data is to be transmitted via USB, encoder/decoders 6 may avoid calculating a CRC check for the HDLC frames. Instead, encoder/decoders 6 may encode the data in frames using a modified format.

After encoding the data in the modified HDLC frames, encoder/decoders 6 may provide the frames to communication units 4. Communication units 4 may receive the frames and encode the frames into USB packets. In the example of FIG. 2, the USB packets may include a CRC calculation. In other examples, the underlying protocol may not include error checking data, or may not perform an error checking method. In either case, communication units 4 may transmit the packets (e.g., to computing device 12).

Encoder/decoders 6 (or other components of computing device 2) may determine that computing device 12 is unable to process frames using the modified HDLC frame format. In some examples, encoder/decoders 6 may determine the inability of computing device 12 based on one or more indications of failure received from computing device 12 (e.g., via communication units 4). For instance, computing device 12 may attempt to process the received data and, responsive to failing to process a frame, may transmit a non-acknowledgement (NAK) of receipt to computing device 2. Encoder/decoders 6 may receive an indication of the NAK. In some examples, responsive to receiving the NAK, encoder/decoders 6 may cause communication units 4 to retransmit the data. In other examples, encoder/decoders 6 may not cause communication units 4 to retransmit the data.

In some examples, encoder/decoders 6 may receive multiple NAKs. Encoder/decoders 6 may determine whether the number of NAKs received is more than a specified threshold value. Responsive to determining that the number of NAKs is more than the threshold value, encoder/decoders 6 may determine that computing device 12 is unable to process frames using the modified HDLC frame format. In other examples, encoder/decoders 6 may determine the inability of computing device 12 based on a lack of response for a specified period of time (e.g., a timeout). That is, computing device 2 may determine that a threshold amount of time has passed without receiving an indication that the receiving device successfully processed the protocol data units. If computing device 2 does not receive a response from computing device 12 acknowledging receipt of the frames within the threshold amount of time, encoder/decoders 6 may determine that the frames have timed out, and that computing device 12 is unable to receive the data and/or is unable to process frames using the modified HDLC frame format.

In response to determining that a receiving computing device cannot process protocol data units of the modified format, encoder/decoders 6 may re-encode the data using a conventional format for the protocol data units. In the example of FIG. 2, encoder/decoders 6 may re-encode the data to be transmitted using the conventional format for HDLC frames. Encoder/decoders 6 may then provide the frames to communication units 4, which may encode the conventional format HDLC frames into USB packets for transmission.

Encoder/decoders 6 may also be operable to decode data received at communication units 4. That is, computing device 2 may utilize encoder/decoders 6 to process the received data (e.g., protocol data units), and provide the processed data (e.g., payload data) to one or more other components of computing device 2 (e.g., application modules 8 or other of encoder/decoders 6). As one example, encoder/decoders 6 may be operable to receive protocol data units (e.g., HDLC frames) from communications units 4. The HDLC frames may be encoded using a modified framing format in accordance with techniques of the present disclosure.

Encoder/decoders 6 may determine that the frames were encoded using the modified format, and process the frames. If encoder/decoders 6 determine that a frame is corrupted, encoder/decoders 6 may drop the frame (e.g., discard the data). That is, in some examples, encoder/decoders 6 may ignore the data if the modified HDLC frame is corrupted. In other examples, encoder/decoders 6 may perform other functions responsive to determining that the frame is incorrect, such as attempting to process the frame as if it were in the conventional frame format.

Encoder/decoders 6 may generate an indication of a failure to receive the data (e.g., a NAK), and cause communication units 4 to send the NAK to the transmitting device (e.g., computing device 12). In some examples, such as where the underlying network layers are unreliable, computing device 2 may send multiple NAKs due to corrupted or un-received data. When the number of NAKs received by the transmitting device exceeds a specified threshold, the transmitting device may re-encode the data using the conventional HDLC framing format and retransmit the re-encoded data. Consequently, computing device 2 may receive USB packets with payload data encoded as frames in the conventional HDLC frame format. After communication units 4 decode the USB packets and provide the payload data to encoders/decoders 6, encoder/decoders 6 may process the conventional HDLC frames.

In some examples, after a transmitting device has transmitted a number of conventional format protocol data units without receiving a threshold number of failures, the transmitting device may automatically begin using the modified format protocol data units once again. That is, if the conventionally formatted frames are mostly received by the receiving device intact, the transmitting device may determine that the underlying network layers are now reliable enough to return to using the more efficient framing format. In other examples, the transmitting device may not return to using the modified format, or may only return to the modified format when a new connection is established with the particular receiving device (e.g., when the devices are disconnected and later reconnected). By automatically switching between transmitting protocol data units formatted using a modified format and transmitting protocol data units formatted using the conventional format, techniques of the present disclosure may allow computing devices to spend significantly less energy in encoding data at the data link layer for transmission. Additionally, by enabling devices to receive both conventionally-formatted protocol data units as well as modified protocol data units, one or more techniques of the disclosure may allow for backward compatible devices, or devices composed of both conventional devices as well as those having improvements described herein.

Figure 3:
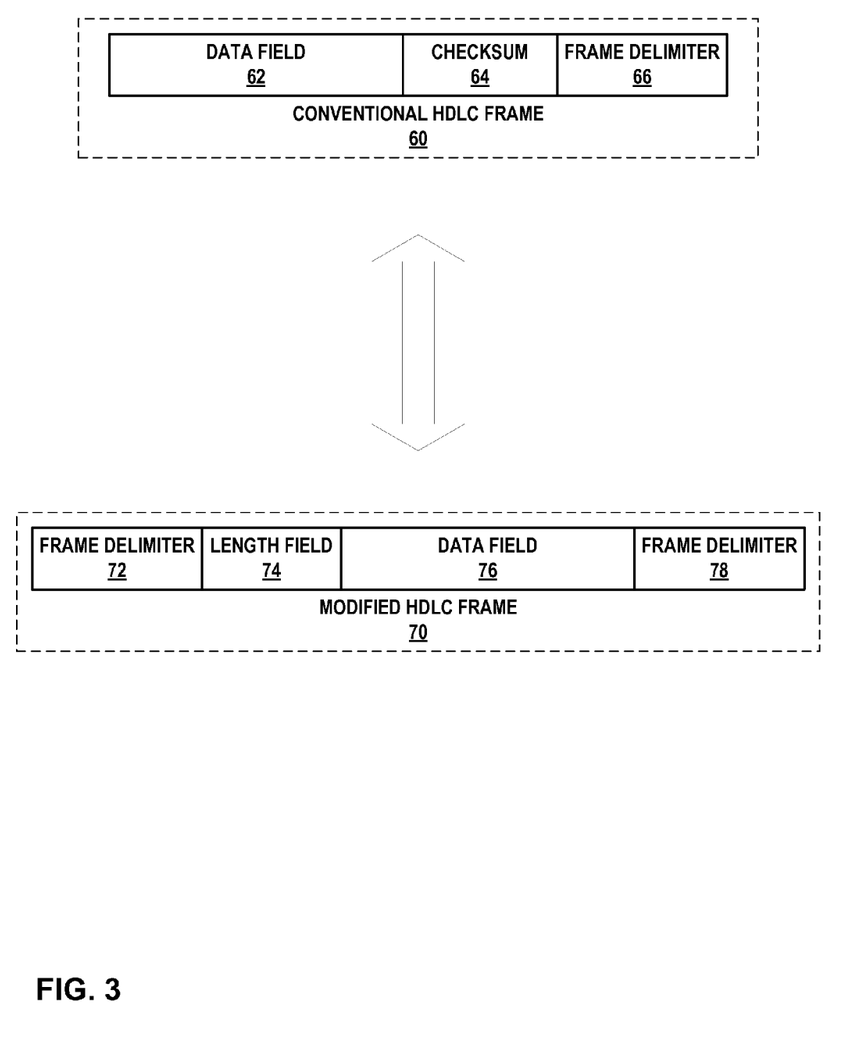
FIG. 3 is a block diagram illustrating example data link layer frames, in accordance with one or more aspects of the present disclosure.

FIG. 3 is a block diagram illustrating example data link layer frames, in accordance with one or more aspects of the present disclosure. For purposes of illustration, the example frames of FIG. 3 are described within the context of FIGS. 1 and 2. FIG. 3 shows two example frames for providing adaptive formatting for protocol data units for a data link layer protocol, although various other example protocol data units (e.g., IP packets, USB packets, UDP frames, or any other protocol data units) may be used in accordance with one or more techniques of the present disclosure.

FIG. 3 includes conventional HDLC frame 60, and modified HDLC frame 70. In some examples, computing devices 2 and 12 may be capable of encoding and decoding both conventional HDLC frame 60 and modified HDLC frame 70. In other examples, only one of computing devices 2 and 12 may be capable of encoding and decoding both conventional HDLC frame 60 and modified HDLC frame 70. In the example of FIG. 3, computing device 2 may, upon initial communication (e.g., via USB) with computing device 12, encode data to be transmitted into a first set of frames, using the format of modified HDLC frame 70. Computing device 2 may then further encode the frames and/or transmit the encoded data (e.g., via USB).

As shown in FIG. 3, modified HDLC frame 70 may include frame delimiter 72, length field 74, data field 76, and frame delimiter 78. Frame delimiters 72 and 78 may indicate to a receiving device the start and end of a frame, respectively. A frame delimiter may, in some examples, be the binary value representing 0x7E. In other examples, frame delimiter 72 and frame delimiter 78 may be represented by different binary values. Length field 74 may be a field indicating the length of data field 76. In some examples, length field 74 may be 2 bytes of data. In other examples, length field 74 may be larger or smaller. Data field 76 may represent the payload data. That is, the underlying information to be transmitted may be contained in data field 76 for consecutive frames. In the example of FIG. 3, the frames may be further encoded into USB packets. After encoding the data, computing device 2 may transmit the data.

Computing device 12 may receive the data transmitted by computing device 2, and may determine the encoding used. For instance, computing device 12 may decode the USB packets to obtain a set of frames encoded using the first format. After obtaining the set of frames, computing device 12 may, in some examples, begin reading a frame and, upon determining that the frame began with frame delimiter 72, may determine that the frame was encoded in accordance with the format of modified HDLC frame 70. That is, computing device 12 may, in some examples, be operable to encode and decode frames formatted in accordance with modified HDLC frame 70. If computing device 12 is unable to process (e.g., encode and/or decode) frames formatted in accordance with modified HDLC frame 70, computing device 12 may send an error indication or other indication (e.g., a NAK) to computing device 2.

If computing device 12 is able to process frames formatted in accordance with modified HDLC frame 70, computing device 12 may, after reading frame delimiter 72, read length field 74 to determine the length of data field 76. After determining the length of the payload data, computing device 12 may read the number of bytes indicated by length field 74 to obtain the data in data field 76. After reading the determined number of bytes, computing device 12 may read the subsequent data in the frame. If the subsequent data is frame delimiter 78 (e.g., 0x7E), computing device 12 may store the data of data field 76. In some examples, computing device 12 may also send an ACK to computing device 2, indicating receipt of the frame. If, however, the subsequent data in the frame is not frame delimiter 78, computing device 12 may not store the data of data field 76 and/or may send a NAK to computing device 2 indicating a failure to process the frame.

In accordance with one or more techniques of the present disclosure, computing device 2 may determine that computing device 12 is unable to process frames formatted in accordance with modified HDLC frame 70. That is, computing device 2 may determine that computing device 12 is unable to decode the frames, or that the underlying network layers corrupted the frames. In either case, computing device 2 may, in one example, receive a number of NAKs, indicating that computing device 12 failed to process a frame. Computing device 2 may determine that the number of NAKs surpassed a threshold value, and consequently that computing device 12 is unable to process frames formatted in accordance with modified HDLC frame 70. As another example, computing device 2 may determine that a threshold amount of time has passed without receiving any indication (e.g., a NAK or an ACK) from computing device 12, and consequently determine that computing device 12 is unable to process frames formatted in accordance with modified HDLC frame 70. Various other examples of determining the inability of computing device 12 may be used.

In response to determining that computing device 12 is unable to process frames formatted in accordance with modified HDLC frame 70, computing device 2 may re-encode the data to be transmitted in to a second set of frames using a second format, such as frames formatted in accordance with conventional HDLC frame 60. In the example of FIG. 3, conventional HDLC frame includes data field 62, checksum 64, and frame delimiter 66. That is, in the example of FIG. 2, conventional HDLC frame 60 may not begin with a frame delimiter. Data field 62 may contain payload data, similar to the data that would be contained in data field 76. Checksum 64 may, in some examples, be a CRC computed based on the data in data field 62. Frame delimiter 66 may indicate the end of one frame and/or the beginning of a second frame. In some examples, frame delimiter 66 may be the same or similar to frame delimiter 72 and/or frame delimiter 78. In some examples, the second set of frames may be further encoded into other protocol data units, such as USB packets. After encoding the second set of frames, computing device 2 may transmit the encoded data to computing device 12 (e.g., via USB connection).

Computing device 12 may receive the transmitted data, and attempt to process the data. Computing device 12 may read data field 62. Because data field 62 does not begin with the specified frame delimiter value (e.g., 0x7E), computing device 12 may determine that the frame is formatted in accordance with conventional HDLC frame 60. Computing device 12 may read the data included in data field 62, compute a CRC or other error checking method, and compare the computed CRC to the CRC contained in checksum 64. If the computed CRC is the same as the CRC included in checksum 64, computing device 12 may store the payload data of data field 62 for transmission to one or more components of computing device 12. In this way, computing device 2 may transmit a first set of protocol data units in accordance with a first format, determine a failure of computing device 12 to process the first set of protocol data units, and automatically transmit a second set of protocol data units in accordance with a second format. That is, computing device 2 may transmit either format in the same data stream, maintaining backwards compatibility.

Figure 4:
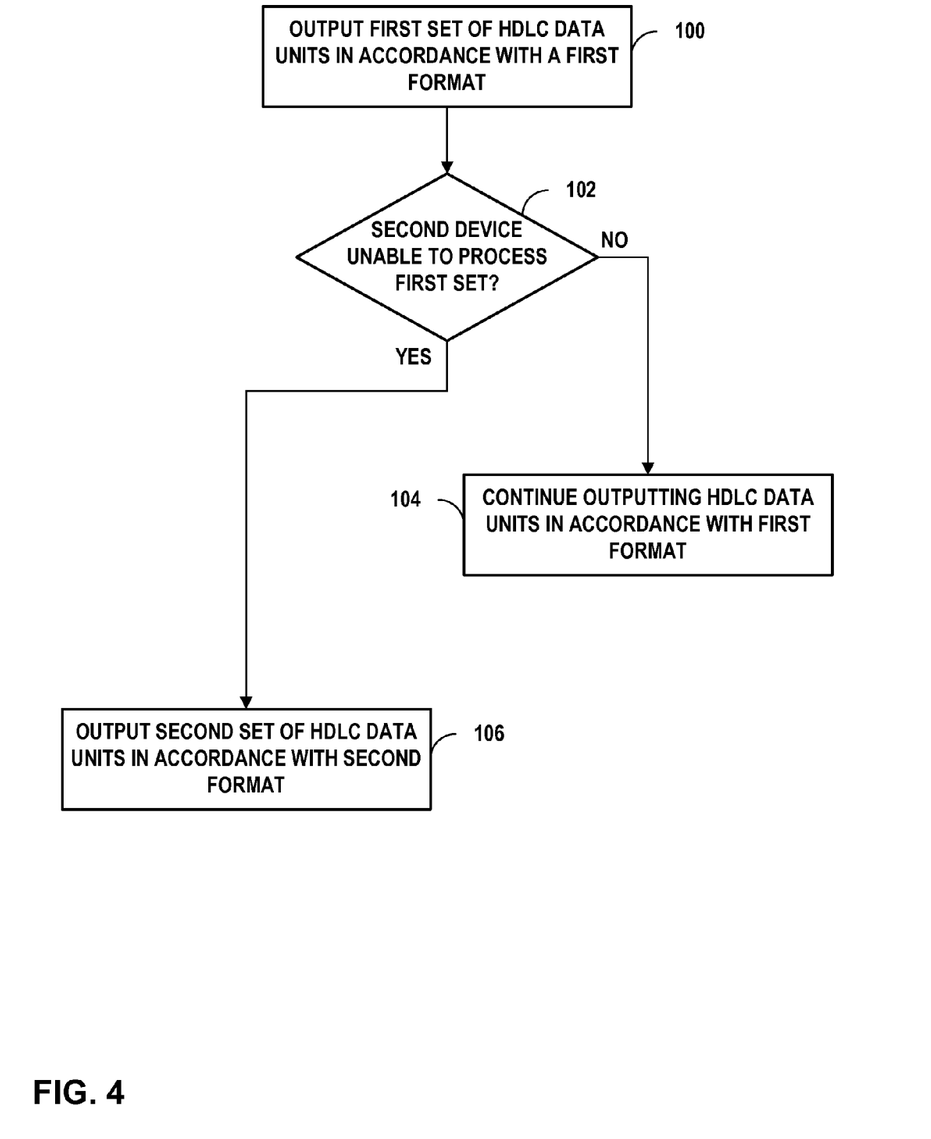
FIG. 4 is a flow diagram illustrating an example process for providing adaptive framing of protocol data units of a data link layer protocol, in accordance with one or more aspects of the present disclosure.

FIG. 4 is a flow diagram illustrating an example process for providing adaptive framing of protocol data units of a data link layer, in accordance with one or more aspects of the present disclosure. For purposes of illustration only, the example operations are described below within the context of computing devices 2 and 12, as shown in FIGS. 1 and 2.

In the example of FIG. 4, computing device 2 may output a first set of HDLC protocol data units (e.g., to computing device 12) in accordance with a first format (100). For instance, computing device 2 may output HDLC protocol data units including a start-of-frame indicator, a length indicator, a data portion, and an end-of-frame indicator. Computing device 2 may determine whether computing device 12 is unable to process at least one of the first set of HDLC protocol data units (102). For example, computing device 2 may receive an indication (e.g., receive an error message or fail to receive an acknowledgement within a time period) that the second computing device is a legacy computing device that is unable to support the modified HDLC encoding. As another example, computing device 2 may receive an indication (e.g., receive an error message or fail to receive an acknowledgement within a time period) that the second computing device received the at least one of the first set of HDLC protocol data units with erroneous data, or did not receive the HDLC protocol data units, due to attempted transmission through a physical communication medium connecting the first computing device and the second. This may, for example, indicate an unreliable nature of the underlying physical communication media and that the physical layer may not provide sufficient error checking and correction.

If computing device 12 is able to process the at least one of the first set of HDLC protocol data units ("NO" branch of 102), computing device 2 may continue outputting HDLC protocol data units in accordance with the first format (104). In response to determining that computing device 12 is unable to process the at least one of the first set of HDLC protocol data units ("YES" branch of 102), computing device 2 may output a second set of HDLC protocol data units in accordance with a second format.

In some examples, the process may include establishing a communication session to communicate data to the second computing device, communicating the data by operating in a first communication mode to output the first set of HDLC protocol data units in the first format, and upon determining the inability of the second computing device to process the at least one of the first set of HDLC protocol data units, automatically switching from the first communication mode to a second communication mode, without re-establishing the communication session, to output the second set of HDLC protocol data units in accordance with the second format. In some examples, determining the inability comprises receiving, by the first computing device and from the second computing device, one or more indications that the second device failed to process the at least one of the first set of HDLC protocol data units, and determining, by the first computing device, that a number of the one or more indications exceeds a threshold value.

In some examples, determining the inability comprises determining, by the first computing device, that a threshold amount of time has passed without receiving an indication that the second computing device successfully processed the at least one of the first set of HDLC protocol data units. In some examples, payload data of the first set of HDLC protocol data units and payload data of the second set of HDLC protocol data units are the same. In some examples, determining the inability comprises receiving an indication that the second computing device received the at least one of the first set of HDLC protocol data units having erroneous data due to transmission through a physical communication medium connecting the first computing device and the second. In some examples, determining the inability comprises receiving an indication that the second computing device is a legacy computing device that is unable to process the HDLC protocol data units in the first format.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may include one or more computer-readable storage media.

A computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   outputting, by a first computing device and to a second computing device, a first high-level data link control protocol data unit in accordance with a first format, the first high-level data link control protocol data unit including a start-of-frame indicator, a length indicator, a data portion, and an end-of-frame indicator;
   determining, by the first computing device, whether the second computing device is able to process the first high-level data link control protocol data unit; and
   responsive to determining that the second computing device is unable to process the first high-level data link control protocol data unit, outputting, by the first computing device to the second computing device, a second high-level data link control protocol data unit in accordance with a second format, the second high-level data link control protocol data unit including the data portion included in the first high-level data link control protocol data unit, a checksum portion, and the end-of-frame indicator, wherein the second high-level data link control protocol data unit excludes the length indicator.

2. The method of claim 1, further comprising:
   establishing, by the first computing device, a communication session to the second computing device;
   while the first computing device is operating in a first communication mode, outputting, by the first computing device and using the communication session, the first high-level data link control protocol data unit in the first format; and
   responsive to determining that the second computing device is unable to process the first high-level data link control protocol data unit:
      automatically switching the first computing device from operating in the first communication mode to operating in a second communication mode; and
      outputting the second high-level data link control protocol data unit in accordance with the second format without re-establishing the communication session.

3. The method of claim 1, wherein determining that the second computing device is unable to process the first high-level data link control protocol data unit comprises:
   receiving, by the first computing device and from the second computing device, an indication that the second computing device failed to process the first high-level data link control protocol data unit.

4. The method of claim 1, wherein determining that the second computing device is unable to process the first high-level data link control protocol data unit comprises determining, by the first computing device, that a threshold amount of time has passed without receiving an indication that the second computing device successfully processed the first high-level data link control protocol data unit.

5. The method of claim 1, wherein the first high-level data link control protocol data unit excludes the checksum portion.

6. The method of claim 1, wherein determining that the second computing device is unable to process the first high-level data link control protocol data unit comprises receiving an indication that the second computing device is a legacy computing device that is unable to process the first high-level data link control protocol data unit in the first format.

7. A non-transitory computer-readable storage medium encoded with instructions that, when executed, cause one or more processors of a first computing device to:
   output, to a second computing device, a first high-level data link control protocol data unit in accordance with a first format, the first high-level data link control protocol data unit including a start-of-frame indicator, a length indicator, a data portion, and an end-of-frame indicator;
   determine whether the second computing device is able to process the first high-level data link control protocol data unit; and
   responsive to determining that the second computing device is unable to process the first high-level data link control protocol data unit, output a second high-level data link control protocol data unit in accordance with a second format, the second high-level data link control protocol data unit including the data portion included in the first high-level data link control protocol data unit, a checksum portion, and the end-of-frame indicator, wherein the second high-level data link control protocol data unit excludes the length indicator.

8. The non-transitory computer-readable storage medium of claim 7, further encoded with instructions that, when executed, cause the one or more processors of the first computing device to:
   establish a communication session to the second computing device;
   while the first computing device is operating in a first communication mode, output, using the communication session, the first high-level data link control protocol data unit in the first format; and
   responsive to determining that the second computing device is unable to process the first high-level data link control protocol data unit:
      automatically switch the first computing device from operating in the first communication mode to operating in a second communication mode; and
      output the second high-level data link control protocol data unit in accordance with the second format without re-establishing the communication session.

9. The non-transitory computer-readable storage medium of claim 7, wherein the instructions that cause the one or more processors of the first computing device to determine that the second computing device is unable to process the first high-level data link control protocol data unit comprise instructions that, when executed, cause the one or more processors of the first computing device to:
   receive, from the second computing device, an indication that the second computing device failed to process the first high-level data link control protocol data unit.

10. The non-transitory computer-readable storage medium of claim 7, wherein the instructions that cause the one or more processors of the first computing device to determine that the second computing device is unable to process the first high-level data link control protocol data unit comprise instructions that, when executed, cause the one or more processors of the first computing device to:
   determine that a threshold amount of time has passed without receiving an indication that the second computing device successfully processed the first high-level data link control protocol data unit.

11. The non-transitory computer-readable storage medium of claim 7, wherein the first high-level data link control protocol data unit excludes the checksum portion.

12. The non-transitory computer-readable storage medium of claim 7, wherein the instructions that cause the one or more processors of the first computing device to determine that the second computing device is unable to process the first high-level data link control protocol data unit comprise instructions that, when executed, cause the one or more processors of the first computing device to:
   receive an indication that the second computing device is a legacy computing device that is unable to process the first high-level data link control protocol data unit in the first format.

13. A first computing device, comprising:
   one or more processors; and
   at least one module operable by the one or more processors to:
      output, to a second computing device, a first high-level data link control protocol data unit in accordance with a first format, the first high-level data link control protocol data unit including a start-of-frame indicator, a length indicator, a data portion, and an end-of-frame indicator;
      determine whether the second computing device is able to process the first high-level data link control protocol data unit; and
      responsive to determining that the second computing device is unable to process the first high-level data link control protocol data unit, output a second high-level data link control protocol data unit in accordance with a second format, the second high-level data link control protocol data unit including the data portion included in the first high-level data link control protocol data unit, a checksum portion, and the end-of-frame indicator, wherein the second high-level data link control protocol data unit excludes the length indicator.

14. The device of claim 13, wherein the at least one module is further operable by the one or more processors to:
   establish a communication session to the second computing device;
   while the first computing device is operating in a first communication mode, output, using the communication session, the first high-level data link control protocol data unit in the first format; and
   responsive to determining that the second computing device is unable to process the first high-level data link control protocol data unit:
      automatically switch the first computing device from operating in the first communication mode to operating in a second communication mode; and
      output the second high-level data link control protocol data unit in accordance with the second format without re-establishing the communication session.

15. The device of claim 13, wherein the at least one module is further operable by the one or more processors to:
   receive, from the second computing device, an indication that the second computing device failed to process the first high-level data link control protocol data unit; and
   responsive to receiving the indication that the second computing device failed to process the first high-level data link control protocol data unit, determine that the second computing device is unable to process the first high-level data link control protocol data unit.

16. The device of claim 13, wherein the at least one module is further operable by the one or more processors to:

determine whether a threshold amount of time has passed without receiving an indication that the second computing device successfully processed the first high-level data link control protocol data unit; and responsive to determining that the threshold amount of time has passed without receiving the indication that the second computing device successfully processed the first high-level data link control protocol data unit, determine that the second computing device is unable to process the first high-level data link control protocol data unit.

17. The device of claim 13, wherein the first high-level data link control protocol data unit excludes the checksum portion.

\* \* \* \* \*